250-506.1 SR
OR 4,144,461

United St
Glasser et al.
[11] 4,144,461
[45] Mar. 13, 1979

[54] METHOD AND APPARATUS FOR ASSAY AND STORAGE OF RADIOACTIVE SOLUTIONS

[75] Inventors: Herman Glasser, New Hyde Park; Patrick F. Panetta, East Islip, both of N.Y.

[73] Assignee: Victoreen, Inc., Cleveland, Ohio ; by said Herman Glasser

[21] Appl. No.: 759,777

[22] Filed: Jan. 17, 1977

[51] Int. Cl.[2] ........................ G21F 5/00; G01T 1/167; G01T 1/00

[52] U.S. Cl. .................................... 250/506; 250/336; 250/395

[58] Field of Search ................ 250/336, 432 PD, 506, 250/507, 328, 395

[56] References Cited

U.S. PATENT DOCUMENTS

| | | | |
|---|---|---|---|
| 3,655,985 | 4/1972 | Brown et al. | 250/506 |
| 3,882,315 | 5/1975 | Soldan | 250/506 |
| 3,997,784 | 12/1976 | Picunko et al. | 250/432 PDX |
| 4,020,351 | 4/1977 | Gemmill et al. | 250/328 X |

*Primary Examiner*—Alfred E. Smith
*Assistant Examiner*—Janice A. Howell
*Attorney, Agent, or Firm*—Lackenbach, Lilling & Siegel

[57] ABSTRACT

An improved method, and apparatus for said method, for providing protection for an operator during the determination of radioactivity, and most especially during the assay of relative concentrations of two radioactive materials in a radioactive solution, are provided. The process for determining the relative concentrations, by comparing the total radiation emitted by a solution in a substantially unshielded vessel with the breakthrough radiation emitted by a shielded vessel of the solution, is improved by utilizing a special shielding container for the radioactive solution which can be used to provide the necessary shielding, for the breakthrough test, and can be removed, for measuring total radiation, without removing the solution from the radiation measuring means, thus avoiding direct human exposure to radiation, and which is also suitable for subsequent use as a protective container for the radioactive solution during medical diagnostic or other utilization following assay.

The radioactive shielding container comprises a hollow body portion, a lower end closure for the body portion which is remotely and quickly detachable therefrom and an upper end closure, the lower surface of the lower end closure preferably having means to prevent rotating motion relative to the support surface.

25 Claims, 10 Drawing Figures

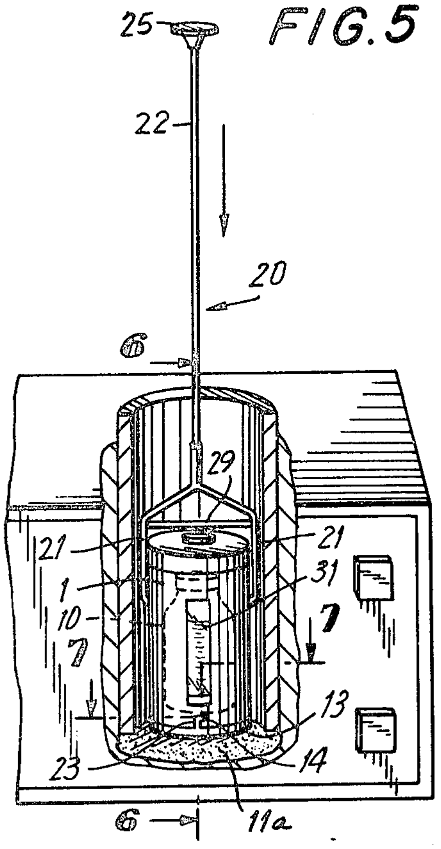
FIG. 5
FIG. 6
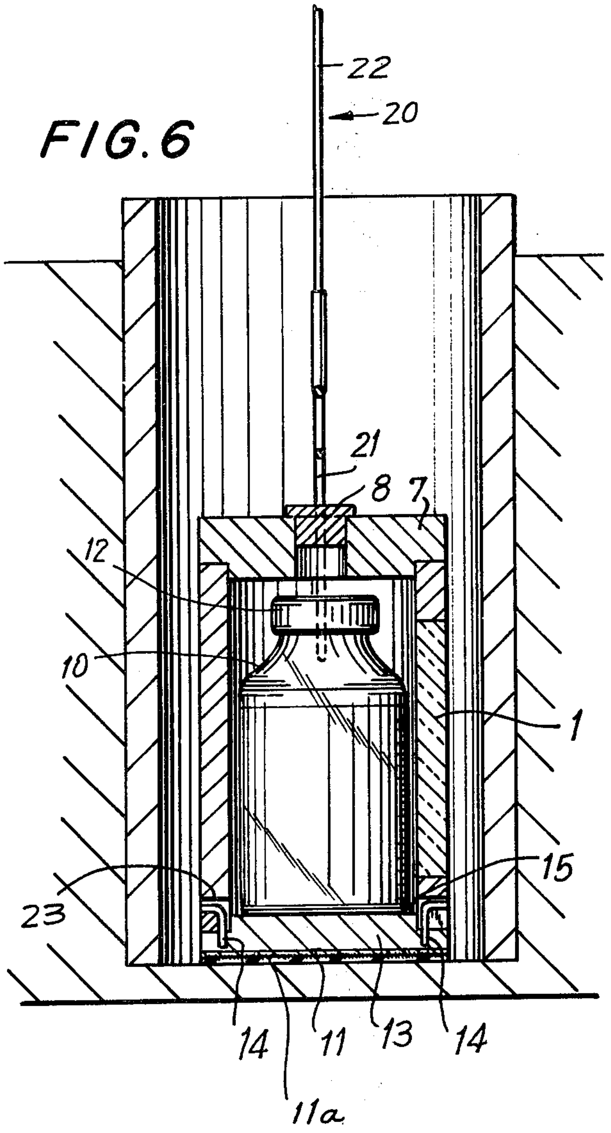
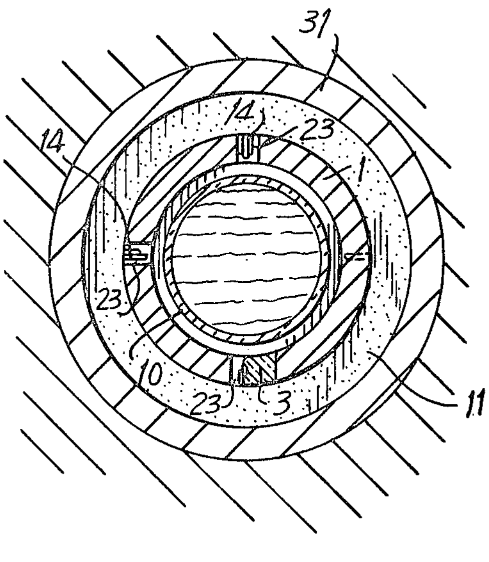
FIG. 7
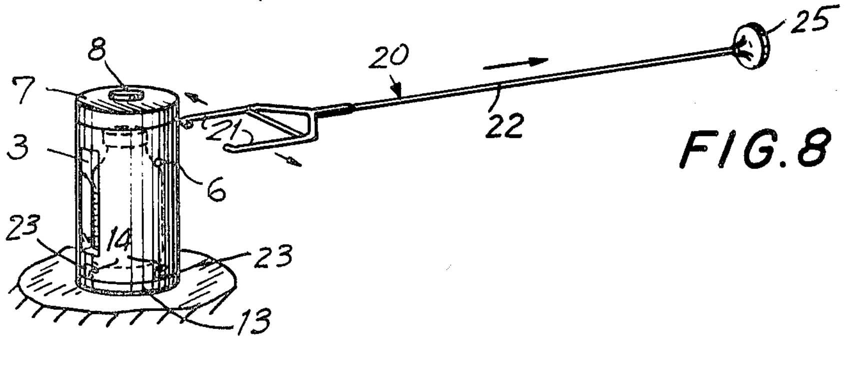
FIG. 8

FIG. 9
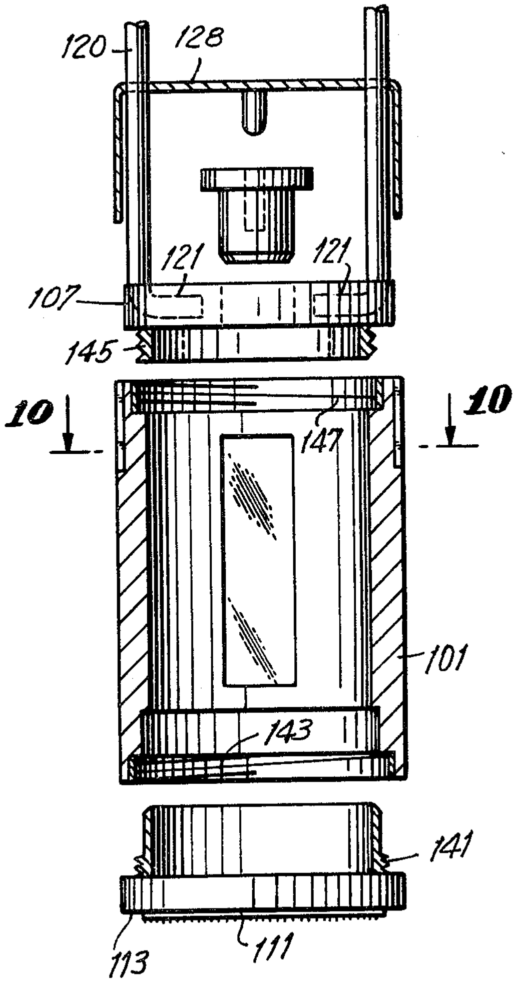
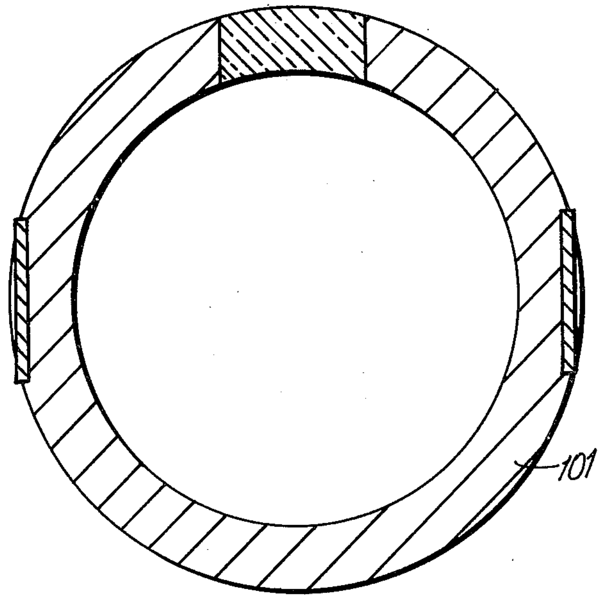
FIG. 10

METHOD AND APPARATUS FOR ASSAY AND STORAGE OF RADIOACTIVE SOLUTIONS

This invention relates to a shielding container for radioactive isotope solutions and more particularly to a shielding container which can be quickly and remotely detachable from a vial containing a radioactive solution without exposing the operator to radiation so as to permit its use, e.g., in determining the relative concentration of two different isotopes in the solution by measuring the unshielded and shielded, "breakthrough", radiation emitted by the solution. The nuclear medical art has been often concerned with the preparation and packaging of a sterile and radioactively safe container system for solutions of diagnostic nuclear medical preparations. A most commonly utilized material for so called radiation diagnosis of human beings is a solution of the radioisotope technetium-99m, generally formed as an eluant in a sterile, pyrogen-free, and isotonic saline solution. The eluant solution is conventionally generated by the solvent extraction of a generator containing a parent isotope of the technetium-99m usually adsorbed on an ion exchange medium, such as alumina. The technetium-99m is a disintegration product, i.e., a daughter, of the parent isotope, conventionally molybdenum-99. The ion exchange medium generally has a high adsorptive capacity for the parent radioisotope but a low adsorptive capacity for the so-called daughter radioisotope, i.e., technetium-99m. The daughter radioisotope is thus obtained in the eluate by washing with the suitable solvent, e.g., the aforesaid saline solution.

The resultant eluate solution of the technetium-99m is especially useful as a diagnostic agent, administered, e.g., intravenously. Accordingly, it is crucial that the saline solution be not only sterile but be free of chemically toxic agents. Unfortunately, the parent molybdenum isotope is highly poisonous and even in extremely small concentrations, measured as micrograms/cc, can be toxic to the human system.

The solution therefore must be analyzed in order to insure that the concentration of the parent isotope in the solution is below the toxic level. It has been found that these two isotopes, as well as other isotopes of a similar nature, can be readily distinguished in the solution because of the significant difference in the energy levels at which the gamma-radiation is emitted. It has been found that where the difference in gamma-radiation is sufficient to enable the measurement of the emission from one isotope, while shielding the emission from another isotope, the relative concentrations of each isotope can be determined by the relative strength of the "breakthrough" radiation of the isotope having the higher energy level radiation, compared to the amount of radiation emitted from the unshielded solution. Thus, in conventional cases, a vial, for example, of a saline solution of technetium-99m obtained as an eluate from the molybdenum-99 generator, is placed into a commercially available dose calibrator.

The radiation level emitted by the solution is then measured. Thereafter, the unshielded vial containing the radioactive solution has been removed from the calibrator, placed into a lead container of a predetermined wall thickness which served as the radiation filter, and the container then placed into the dose calibrator sample well and a further measurement taken. The relative amount of radiation measured from the shielded solution compared to the total radiation from the unshielded solution then determines the amount of molybdenum-99 present in the solution. It has been found that technetium-99m emits gamma rays at 141keV while molybdenum-99 emits gamma radiation at a 180keV level and higher.

This previous system, however, required a great deal of handling of the vial in an unshielded condition, especially when the vial was removed from the calibrator, which was shielded, to be placed into the lead container, thus exposing the technician to a dangerous radiation hazard. Unfortunately, however, because of the difficulty of arranging a shield for the vial to be handled remotely, the art was forced to follow this otherwise hazardous technique, unless extremely complicated and expensive remote control handling apparatus was available.

A variety of heavy metal containers, generally formed of lead, have been used for the storage of such radioactive solutions. For example, a lead container for technetium-99m solution is disclosed in U.S. Pat. No. 3,655,985, which comprises a central hollow body portion and screw threadedly detachable upper and lower closures. This lead container has been suggested for use as a transfer means in a shielded assay test for such radioactive isotopes, referring specifically to the system of U.S. Pat. No. 3,506,832. However, this container did not provide any relief for the technician actually carrying out the assay; it required the removal of the bottle from the lead container before the assay test was carried out, thus exposing the technician to radiation during handling.

In accordance with the present invention, an improved method for measuring the total radiation emitted from a vial of a radioactive material is provided, and most preferably a method for determining relative concentrations of two admixed radioactive materials, having widely varying energy levels of emitted gamma-rays, is provided.

The prior art placed an unshielded vial of a radioactive material in a radiation measuring means, and after measuring the radioactivity, removed the vial and placed it into a radioactivity-shielding outer container. The preferred method, as previously carried out, comprised measuring the total gamma-ray activity of a mixture of radiative materials, e.g., in a solution, in a vial in a substantially unshielded condition, removing the vial from the measuring means, placing the vial into a shielded container, replacing the shielded vial into the measuring means, and measuring the shielded "breakthrough" gamma radiation emitted by the mixture; the shielded container is so designed and adapted as to block substantially completely the gamma-radiation of the first material having the lower energy radiation level, but to permit the passage of radiation at the higher energy level from the second material, the difference in total radiation measured being directly proportional to the relative concentration of the second material to the first material. The improved method of this invention comprises placing the vessel initially into a container formed of a radiation-shielding material, the container comprising a hollow body portion, a lower end closure for the body portion, the lower closure being remotely and quickly detachable from the body portion and an upper end closure; placing the vessel and container into a radiation measuring means so as to rest on a support floor within the measuring means, remotely detaching and removing the body portion and upper closure from around the vessel sufficiently to permit unshielded gamma-radiation to pass from the vessel to the radiation measuring means and measuring the total radiation emitted from the solution. In the preferred method, breakthrough gamma-radiation passing through the shield container is also measured. The entire radiation assay can thus be carried out without removing the unshielded vial from the measuring means and without exposing the technician to any harmful radiation. This can be carried out without any complicated handling equipment other than simple tongs or other holding means.

It is preferred that the upper closure be detachably connected to the body portion, so as to render more efficient the initial removal or entry of the vessel within the body portion. Preferably, the upper end closure also has an upper opening therethrough, smaller than the internal cross-section of the hollow body and substantially centered over the internal cross-section, and a detachable cover of radiation-shielding material overlying the upper opening. When the detachable cover is removed, the inner vessel can be filled or material removed without exposing the operator to radiation.

The joint between the hollow body portion and the lower end closure is preferably of the rotating disconnect type, which provides a positive connection, and disconnection, by rotating through an angle of less than about 90° and optimally less than about 20°. Such a joint generally described as a bayonet-like joint, generally includes at least one convex, male member, rigidly connected to at least one of the body portion and lower closure, and a concave, female member, in the other of the body portion and lower closure, so situated as to permit separation of the body portion and lower closure in one angular position and to be locked together to prevent separation at another angular position, less than about 90° apart.

In the most preferred quick-connect "bayonet-type" joint, a pin on one of the body portion and lower end closure plays in and out of a socket in the other of the two members, serving to engage or disengage the two members in a positive, but quick fashion. Most preferably, the bayonet joint comprises at least two such juxtaposed pin-and-socket combinations in order to insure a firm support. It is noted that the engaged pins in the sockets provide the connection between the body portion and the lower closure, such that when the entire combination is held by the body portion, the full weight of the lower closure and the vessel within the hollow body portion, are supported by the engaged pins in the sockets. Thus, optimally, at least three and preferably four such engaging pins and sockets are provided. Alternately, the joint can be of the threaded type, preferably requiring no more than about two complete rotations, and optimally not more than about 1½ rotations, between the fully open and fully closed positions.

The lower portion specifically the bottom surface, of the lower closure is preferably formed of a material which resists movement parallel to the interfacial plane of engagement between the container and the support floor. Such a surface can include, for example, a "sanded" surface, i.e., one having a coating, for example, a paint film, which includes small grains of hard, gritty material, which increases the coefficient of friction of the surface. Alternatively, the bottom surface of the lower closure can be roughened, as by knurling or forming ridges in the surface, and preferably with corresponding ridges on the support floor of the measuring means. Most preferably however, a "Velcro"-type material, having minute, almost microscopic, joining means, which are similar to "hooks and eyes" which join together and substantially completely prevent rotating motion between the lower closure and the surface upon which it rests. Thus, it is possible to twist, and cause the rotation of, the body portion relative to the lower closure, without causing the lower closure to move relative to the floor upon which it rests.

Handle means are provided, detachably connected to the hollow body portion, preferably to the exterior surface thereof, so as to permit the remote rotation of the body portion in a manner to move the bayonet joint pins into and out of engagement with the sockets, forming the joint. When the socket and pins are disengaged, the body portion can be vertically lifted away and separated from the lower end closure, leaving the vessel resting on the lower end closure within the measuring means.

The hollow body portion, the lower end closure and the upper end closure are all formed of a material which is a substantial shield against gamma-radiation of a maximum defined energy level. This is generally determined from the energy levels at which each isotope emits its gamma-radiation. The shield should have the capability of substantially preventing the passage of gamma-radiation from the isotope having the lower energy level, but permitting the passage of gamma-radiation emitted by the isotope having the higher energy level radiation. Thus, for example, when the determination is to be made of the small amount of molybdenum-99 present in admixture with technetium-99m, the container is so designed as to permit the passage of gamma-radiation of about 180keV and higher, and to substantially completely prevent the passage of gamma-radiation at 141 keV. Optimally, therefore, to insure complete "breakthrough" the shield is so set as to pass all radiation having an energy level of at least about 175keV. The shield material, i.e., the material from which the body portion, and lower and upper end closures, are to be formed, include any of the useful gamma-radiation-shielding materials, that is, those materials which are capable of absorbing, and preventing the passage of, gamma-radiation. Useful materials include preferably lead, as well as antimony-lead iron alloy, as well as a composite material formed of lead compounds, for example, lead salts, such as lead sulfide or lead carbonate, or lead oxide, embedded in a synthetic polymeric plastic material, e.g., polyethylene, generally in a ratio of nine parts lead compound to one part synthetic polymer. Any other materials, now known or developed in the future which have the capability of thus selectively shielding gamma-radiation can be utilized.

The thickness of the container walls, including the body portion and upper and lower end closures, is generally what determines the capability of the container to selectively shield the lower radiation energy levels and pass the desired upper radiation energy levels. Specifically, it has been found when testing a solution of molybdenum-technetium, mother/daughter materials, a lead shield, for example, can be formed for the determination, or assay, of the amount of molybdenum present, where the thicknesses of the walls of the body portion and the upper and lower end closures are in the range of from about 0.19 to about 0.3 inch, and preferably in the range of from about 0.197 to about 0.25 inch. The determination of the necessary thickness for other materials than lead is one which can be conventionally made by those skilled in the art, and thus is not in and of itself a part of this invention. Materials which are of less adsorptive capability than lead, of course, require a thicker shield and those which have a greater adsorptive capacity than lead, if such are developed, would require a lesser thickness.

The following drawings present a preferred embodiment of the present invention. The present invention, however, is not to be taken as limited to the specific type of radiation measuring mechanism nor to the particular configuration of the preferred embodiment shown. Other types of containers, as well as other types of radiation counters, can be utilized within the purview of the present invention, utilizing the general principles stated herein above and below.

Referring to the drawings;

FIG. 5 is a perspective, partially cut-away, view showing the hollow body portion and upper end closure being replaced onto the lower end closure around the vessel;

FIG. 6 is a cross-section view along lines 6—6 of FIG. 5;

FIG. 7 is a cross-section view taken along lines 7—7 of FIG. 5;

FIG. 8 is a perspective view showing the container out of the radiation calibrating means well, with the handle removed;

FIG. 9 is an exploded view of a second preferred embodiment of this invention; and FIG. 10 is a plan view in the direction of 10—10 of FIG. 9.

Figure 1:
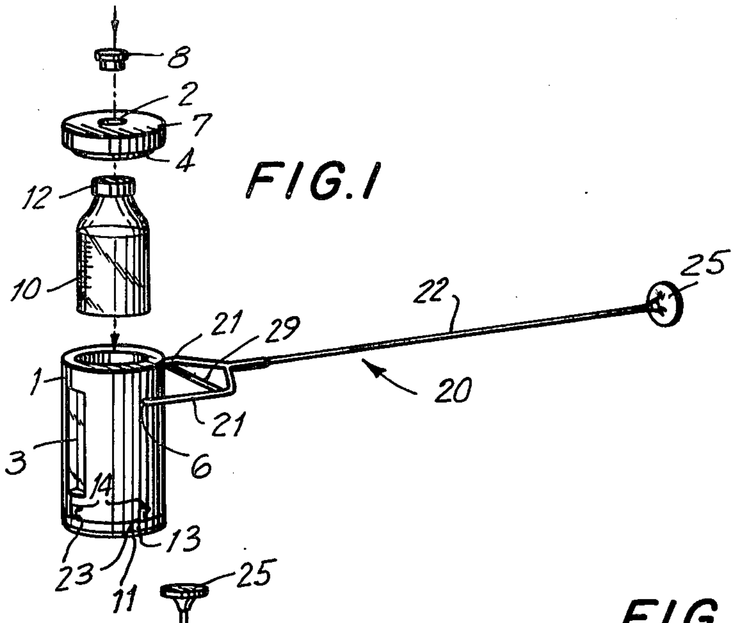
FIG. 1 is a perspective view illustrating the manner in which the inner vessel is lowered into place into the shield container.

In FIGS. 1 through 8, the apparatus of the present invention, in one of its preferred embodiments, comprises a hollow body wall portion 1 defining an internal cross-section open portion, and adapted to enclose a vessel 10 generally made of a transparent material suitable for containing a liquid, e.g., an aqueous solution of compounds of radioactive isotope material. An upper end closure 7 is provided which is threadedly attachable onto the upper end of the hollow body portion 1. The upper end closure 7 has formed therethrough an upper opening defined by an internal surface 2 which is centered over the interior open portion of the hollow body portion 1. An upper closure plug 8 fits into and completely secures the opening 2. The lower end of the hollow body portion 2 is closed by a lower end closure 13. The lower end closure 13 is secured to the hollow body portion 1 by a quick disconnect, rotatably secured, joint means, in this case, comprising a bayonet joint formed of four pins 14 substantially equi-angularly placed adjacent the outer periphery of the lower end closure 13. The pins are rigidly attached to the upper surface 15 of the lower end closure 13 extending upwardly therefrom, and having an upper transverse portion 14*a* extending radially outwardly from the vertical portion of the pin 14. Similarly shaped slots are formed through the lower peripheral edge of the hollow body portion wall 1 defined by surfaces 23.

The lower surface 11 of the lower end closure 13 is, in its preferred embodiment, formed of a material which resists movement in a direction parallel to the interfacial plane of engagement with a surface upon which the container rests. In the preferred embodiment illustrated in the figures of the drawing, such a surface comprises a multiplicity of adjacent, extremely small, hooks and piles, which when in contact with a second surface having a similar material will successfully resist such shearing forces moving in a direction parallel to the interfacial plane of engagement, yet will permit easy separation in response to a force essentially normal to the interfacial plane. Such a material is commonly known as "Velcro", marketed in the United States by the American Velcro, Inc., see, e.g., U.S. Pat. No. 2,717,437.

Two sockets, 6, are formed in theouter peripheral wall of the hollow body portion 1, extending only partially through the wall, and being spaced substantially on the same diameter of the generally circular hollow body portion 1. A handle, generally indicated by the numeral 20, is provided to support and move the container in the desired direction. The handle 20 comprises a pair of relatively movable bent prong portions 21 which are movable towards and away from each other by operation of a conventional mechanism from the handle end 25 along the elongated shaft 22 to the prongs 21. A telescoping pair of rods 29 provides the desired movement and support for the prongs 21. The mechanism for providing the relative movement of the prongs 21 in the handle is conventional in the art and does not form any part of this invention. Similarly, the precise configuration of the handle and the method of its movement is also not a part of this invention and need not be more explicitly defined.

Figure 2:
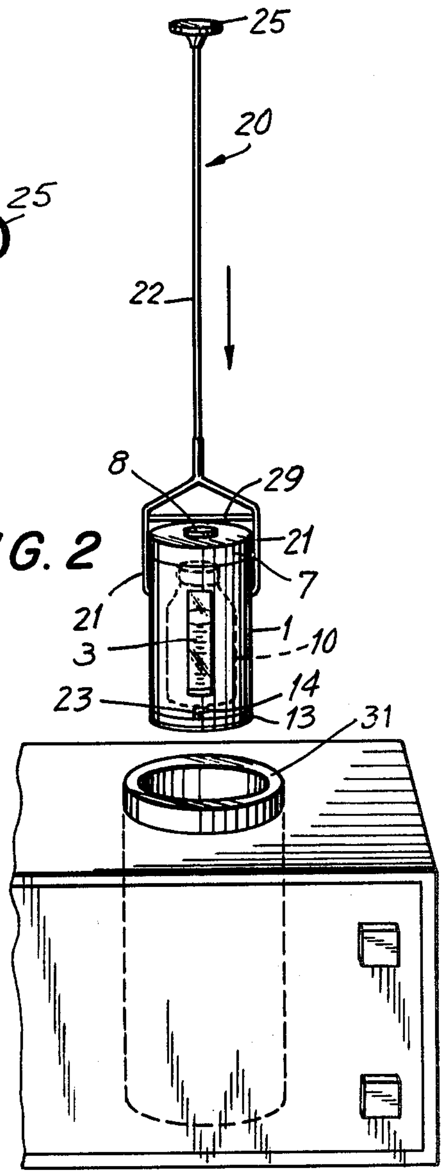
FIG. 2 is a perspective view, showing how the container and vessel are lowered into a radiation calibrating means measuring well.

In accordance with the process of this invention, a vessel 10 containing the desired radioactive solution is placed within the hollow body portion 1 of the container and the upper end closure 7 and lower end closure 13 secured thereto. The handle 20 is secured to the hollow body portion through sockets 6 and the entire assembly lifted and transported into a well of an isotope calibration device, generally indicated by the numeral 30, as shown in FIG. 2. The well is defined by the wall surface 31, and comprises a lower supporting floor 32 and an open upper end.

The radiation calibration means which can be used in the method of the invention can be any of several conventional devices commonly used in the art, for assaying the proportions of various radioactive isotopes present in solution, in combination, by determining the total radiation in proportion to the "breakthrough" radiation emitted by one of the specific, higher energy level, isotopes. The devices now conventionally used are of two general types: a Geiger-Muller-type radiation calibration means and an ionization chamber-type radiation calibration means. Each of these devices includes a well, or chamber, having generally cylindrical side walls, within which a container of the material to be tested is supported on a floor surface. In the Geiger-Muller-type detector, one or more such point-type detectors are spotted around the circumference of the side wall. In the ionization chamber device, the entire circumference (360°) of the side wall constitutes the detector. One example of the Geiger-Muller-type calibration means is RAD-CAL (manufactured by Nuclear Associates, Inc., Carle Place, N.Y.). Any other well-type of calibration means can be utilized for this invention, including any now known or to be developed in the future.

It is common practice in the industry to provide a gamma-radiation shield exteriorly of the calibration, or measuring, means to protect the operator. Such a shield can be formed as the case for the calibration apparatus or the calibrating means can be placed within a shielded area while carrying out the measurement.

Thus, the radioactivity exposure of the operator previously occurred when the vial was removed from the calibration means to be placed within the previously available shielded container.

The breakthrough radiation is then measured with the entire container in place, including the hollow body portion 1 around the vessel 10. The hollow body portion is then rotated (utilizing the handle 20) relative to the lower end closure 13 in a counterclockwise direction so as to disengage the horizontal portion of pins 14 from the horizontal portion of slots 23. The hollow body portion 1 is then vertically raised, out of the well 31 together with the upper end closure 7. The thus exposed vessel 10 remains in the well 31 resting upon the upper surface 15 of lower end closure 13. The lower end closure was not rotated relative to the floor 32 because of the resistance of the Velcro material. As indicated above, preferably, the lower surface 32 of the well 31 has a mating Velcro surface. The total radiation emitted from the thus exposed vessel 10 is then measured, and the relative proportion of the higher energy level radio-emitting isotope is thus assayed. After completion of the measurement, the hollow body portion 1 is vertically lowered back onto the lower end closure 13 and rotated so as to re-engage the bayonet pins 14 into the horizontal portion of slots 23, as shown in FIG. 5. The entire container, containing the vessel, can then be vertically lifted out of the well 31 and removed to any place for storage or further use. The handle is desirably removed from the container by causing the relative outward movement of prongs 21, i.e., away from each other, thus permitting the removal of the prongs 21 from sockets 6 and the disposal of the handle 20 as desired.

In use, the preferred embodiment of the container is especially adapted for containing a vessel, or vial, suitable to serve as a reservoir for a syringe. The upper cap 12 of the vessel 10 is particularly adapted to permit the passage of a syringe or needle therethrough and into the liquid contained in the vessel. When such use is desired, the upper plug 8 is removed and the syringe can then pass through opening in the end closure 7 and the needle is thus able to penetrate the cap 12 as desired. The construction of such a cap 12 is conventional in the art, and again forms no part in this invention.

A further preferred embodiment shown in the drawings, an elongate, transparent window 3 is formed of a gamma-radiation-shielding, visually transparent material, secured to and filling an opening through the hollow body portion 1. Preferably, the thickness of the transparent material 3 is sufficient to provide the desirable shielding against the low energy gamma-radiation emitted by one or more of the isotopes.

In a further embodiment, in order to compensate for the difference in specific shielding effectiveness of a transparent window material compared to the remainder of the container, the wall thickness of the window can be substantially greater than the remaining wall thickness, such that the interior hollow space is not concentric with the longitudinal axis of the exterior periphery of the hollow body portion 1. Such a device is shown for example as a syringe holder in U.S. Pat. No. 3,596,659.

The quick release joints between the hollow body portion 1 and the lower end closure 13, shown in the embodiments of the drawings herein, are a bayonet joint and a screw thread joint. However, other quick release means can be utilized which permit the ready separation between the hollow body portion 1 and the lower end closure, in order to permit the carrying out of the calibration in accordance with the method of the present invention without exposing a technician to radiation hazard. For example, in a substantially equivalent joint, the bayonet pins can be rigidly connected to the lower periphery of the hollow body portion, and mating slots formed in the lower end closure. Alternatively, bayonet pins and slots can be formed in both the lower portion of the hollow body portion 1 and the lower end closure 13 which mate with the corresponding opposite member. Furthermore, as a substantial equivalent of a bayonet joint, a bayonet-like joint can be utilized wherein the engaging and disengaging, male and female portions are formed as cams which are moved in and out of engagement juxtaposition by rotating the hollow body portion relative to the lower end closure, for example.

The container, including the hollow body portion 1, the upper end closure 7 and plug 8 and lower end closure 13 are all formed of a material which provides the desired shielding against gamma-radiation. Generally, these materials absorb the gamma radiation and include, for example, lead, antimony-lead alloys, or composite materials formed of lead compounds, for example lead salts, such as lead carbonate and lead sulfide or lead oxides, embedded in a binding material, preferably a synthetic polymeric resin material, such as polyethylene. The transparent window material (3), can also be formed of such lead compounds, preferably lead salts, adformed as a glass.

The bayonet pins 14, any equivalent cams, or threads, can be formed of the same gamma-radiation shielding material as the remainder of the container, but are preferably formed of a harder material, such as steel, or brass. Furthermore, the engagement slots 23 can be formed directly into the radiation-shielding material, but, again preferably, can be lined with a harder substance, such as steel, or brass.

In determining the ability of the lead container to act as an assay shield, that is to permit the passage, or breakthrough, of higher energy gamma-radiation from one isotope, but to prevent the passage of lower energy gamma-radiation from another isotope, the thickness of the container must be accurately determined. Such thickness is determined by calculations well known to the art in accordance with the formation of assay shields now used in such isotope calibrations. In accordance with a preferred embodiment of this invention, a shielding-container such as the cylindrical container shown in FIG. 1 is formed with the following dimensions: a length of 3 inches for the hollow body portion 1, an external diameter of 1.92 inches, an internal diameter of 1.52 inches, a wall thickness of 0.2 inch, a thickness for the upper end closure 7 of 0.2 inch, and a thickness of the lower end closure 13 of 0.2 inch.

Figure 3:
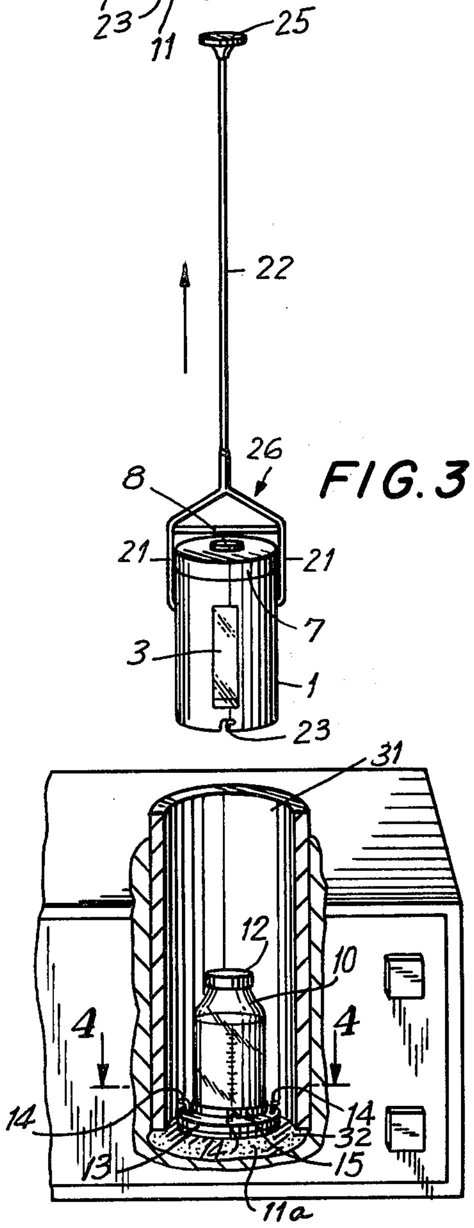
FIG. 3 is a perspective, partially cut away, view showing the hollow body portion and upper closure being lifted away from the vessel.
Figure 4:
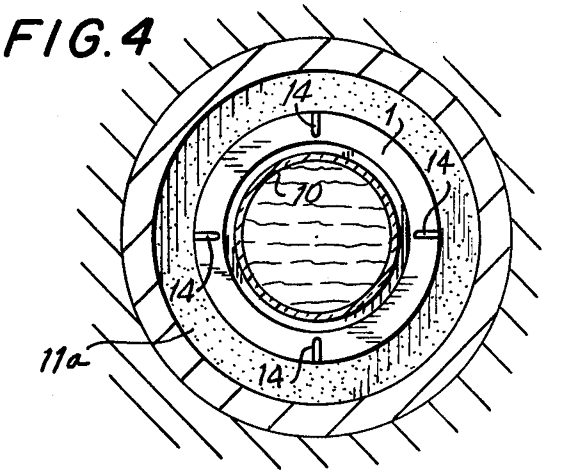
FIG. 4 is a cross-section view along lines 4—4 of FIG. 3.

As yet a further embodiment of the invention, in order to avoid an off-centered hollow interior for the hollow body portion 1, an additional exterior shield can be provided if desired, adjacent the window 3 during the measuring operation, especially in a 360° detecting ionization chamber-type calibration means. Such a means can be secured to the hollow body portion 1, for example, together with the handle 20 or in any other way. The shield can then be removed when the hollow body portion is withdrawn during the total measurement, i.e., as shown in FIG. 3, and the window can thus be exposed to permit viewing of the interior vessel during storage and use. The amount of radiation passing through the window will in any event be relatively small and insufficient to create any substantial radiation hazard for workers.

When utilizing the Geiger-Muller-type calibration means a shield is unnecessary as long as the container is placed in the well with the window facing in a direction at least 90° away from a radiation detector. Even in an ionization chamber-type calibration means, the relatively small amount of additional radiation can be compensated by, for example, the use of a conventional nomograph.

Referring to FIGS. 9 and 10, a further preferred embodiment is shown which differs from the previously described embodiment in the following manner. The lower end closure 113 and upper end closure 107 are each connected by a screw threaded joint to the lower and upper ends, respectively, of the body portion 101. An externally threaded brass ring 141 is firmly secured to the lower end closure 113 and a mating internally threaded brass ring 143 is secured to the inner circumference at the lower end of the body portion 101. The threaded joint is completely secured with 1.5 complete turns. A second set of an externally threaded brass ring 145 and internally threaded brass ring 147 is secured to the upper end closure 107 and upper end of the body portion 101, respectively. The upper threaded joint 145–147 is threaded in a reverse direction than the lower threaded joint 141–143.

In the second embodiment, the handle 120 comprises a generally flexible U-shaped wire. The open ends 121 of the U are bent inwardly towards each other and fitted within two sockets 106 formed into the side surface of the upper end closure 107. A slidable handle lock 128 serves to prevent the separation of the two ends 121 when the lock 128 is at a lower position, i.e., juxtaposed against the top of the upper end closure 107. To further secure the upper closure plug 108, a nipple 150 is formed on slide lock 128 and a mating socket 151 formed in the top of upper plug 108. The nipple 150 fits within socket 151 when the lock 128 is in the locking position.

Otherwise, the second embodiment, of FIG. 9 and 10, is substantially the same as, and is to be used in the same manner as, the first embodiment of FIGS. 1–8. When carrying out the procedure of this invention utilizing the second embodiment, it is only necessary to rotate the body portion 101 1.5 complete turns in order to disengage the lower end closure. The gripper strip (Velcro) 111 at the bottom of lower closure 113 serves the function of preventing the rotation of the lower closure with respect to the floor of the well.

In a preferred embodiment of the apparatus of this invention, the apparatus is provided, in kit form, with a sheet of material which can be adhered to the support surface within a calibration means, and which in contact with the bottom of the shielded container, provides the desired resistance to rotational movement. For example, the shielded container can be provided with a Velcro strip on the lower surface of the lower end closure and with a second Velcro strip 11*a* having adhesive on the reverse side for connection to the calibration means support surface. Other combinations of contacting surfaces can be used to provide the desired resistance to rotational motion, e.g., even sandpaper.

The patentable embodiments of the aforedescribed invention which are claimed are as follows:

1. In a method for determining the radiation emitted by a radioactive sample comprising measuring the total radiation activity of said sample in a substantially unshielded vessel and comparing this measurement with the breakthrough radiation emitted after shielding the sample, the improvement which comprises substantially reducing radiation exposure during said measuring by placing said radioactive sample in a shielded container having removable upper and lower end closures; closing said container; placing said closed, shielded container containing the radioactive sample in a shielded radiation measuring device so that the lower end closure becomes affixed therein; disengaging the shielded container from the lower end closure, removing it from the radiation measuring device, thereby leaving behind the radioactive sample; and measuring the radiation of said unshielded sample.

2. The method of claim 1, wherein the radiation being measured is gamma radiation.

3. The method of claim 2, wherein the breakthrough radiation of the shielded sample is measured prior to disengagement and removal of the shielded container.

4. The method of claim 2, wherein the shielded container is engaged to the lower end closure prior to removal of said radioactive sample from the radiation measuring device.

5. The method of claim 2, wherein said radioactive sample consists of two radioisotopes in admixture, a first radioisotope being at a lower energy level than a second radioisotope.

6. The method of claim 5, wherein said shield substantially blocks the radiation emitted by said first radioisotope and permits the passage of the radiation emitted by the second radioisotope.

7. The method of claim 6, wherein said first radioisotope is molybdenum 99 and said second radioisotope is technetium 99m.

8. The method of claim 2, wherein the container is formed of a gamma radiation resistant material selected from the group consisting of lead, lead alloys, and composite material comprising a binder and lead compounds.

9. The method of claim 2, wherein the radioactive sample comprises an aqueous solution of compounds of technetium 99m and molybdenum 99, and wherein the container is capable of shielding substantially all gamma radiation emitted at an energy of less than 180keV.

10. The method of claim 1, wherein said measuring is accomplished remotely.

11. In a radioactive shielding container suitable for assay and storage of radioactive material comprising a hollow body portion defining an interior space suitable for holding a vessel containing a radioactive sample; an upper and a lower end closure for the body portion, said end closures having means for removable attachment to said body; the wall thickness of said container adapted to selectively shield predetermined amounts of radiation, the improvement which comprises the provision of securing means to maintain said lower end closure in a fixed stationary position so that said hollow body portion can be removed without disturbing the contents of the vessel containing the radioactive sample resting within the shielded container.

12. The container of claim 11, wherein the attachment means comprises external screw thread means formed on the lower end closure and mating thread means on the body portion, the threads being so formed as to require not more than about two complete turns between the fully disengaged and fully locked positions.

13. The container of claim 11, wherein the attachment means comprises a bayonet-like joint comprising at least one convex, male member, rigidly connected to the body portion and lower end closure, and at least one concave, female member, formed in the body portion and lower closure, so situated as to permit separation of the body portion and lower closure in one angular position and to be locked together to prevent separation at another angular position, the two angular positions being less than about 90° apart.

14. The container of claim 11, wherein the bayonet-like joint comprises a plurality of pins, equidistantly arranged adjacent to the periphery of the lower end closure and a plurality of mating sockets formed in the lower portion of the hollow body portion, the relative rotation between the hollow body portion and the lower end closure required to engage and disengage the pins and sockets being less than about 20°.

15. The container of claim 11, wherein said securing means are operatively installed in the lower end closure, and adapted to resist horizontal movement of the lower end closure, when the lower end closure is resting upon a support surface.

16. The container of claim 15, wherein said securing means comprise a multiplicity of interlocking gripper means installed on the bottom surface of the lower end closure.

17. The container of claim 15, wherein said securing means are installed on the bottom surface of the lower end closure and have a high coefficient of friction.

18. The container of claim 11 formed of a gamma radiation absorbing material selected from the group consisting of lead, lead alloys, and composite materials comprising a binder and lead compounds.

19. The container of claim 11 comprising in addition a transparent window strip portion extending longitudinally along and through a minor portion of the hollow body portion, the transparent window strip being formed of a visibly transparent, gamma radiation shielding material.

20. The container of claim 19 comprising in addition external lead shielding means, connected to the hollow body portion and covering the transparent window strip, such that the total gamma radiation absorbing effectiveness of the window strip and the external absorbing means are not substantially greater than the amount required to obtain the selective shielding effect.

21. The container of claim 20 wherein an aperture is formed through the upper end closure, substantially concentric with the interior hollow space, and comprising in addition a plug detachably secured in said aperature.

22. In kit form, the container of claim 15 in combination with a second securing means on said support surface, adapted to coact with the container securing means to maintain the lower end closure of the container in a fixed, stationary position.

23. The container of claim 22, wherein the second securing means comprise a multiplicity of interlocking gripper means secured to the second surface which coact with the multiplicity of interlocking gripper means secured to the bottom surface of the lower end closure.

24. The container of claim 11, wherein means are provided for remotely detaching the body portion from the lower end closure.

25. The container of claim 24, wherein said remote detaching means comprise a handle adapted to remove the hollow body portion from the lower end closure.

* * * * *